3,050,819
MANUFACTURE OF BULKED FIBER
William T. Allman, Jr., Rock Hill, S.C., and Claude E. Layman, Charlotte, N.C., assignors to Celanese Corporation of America, New York, N.Y., a corporation of Delaware
Filed June 3, 1958, Ser. No. 739,522
19 Claims. (Cl. 28—1)

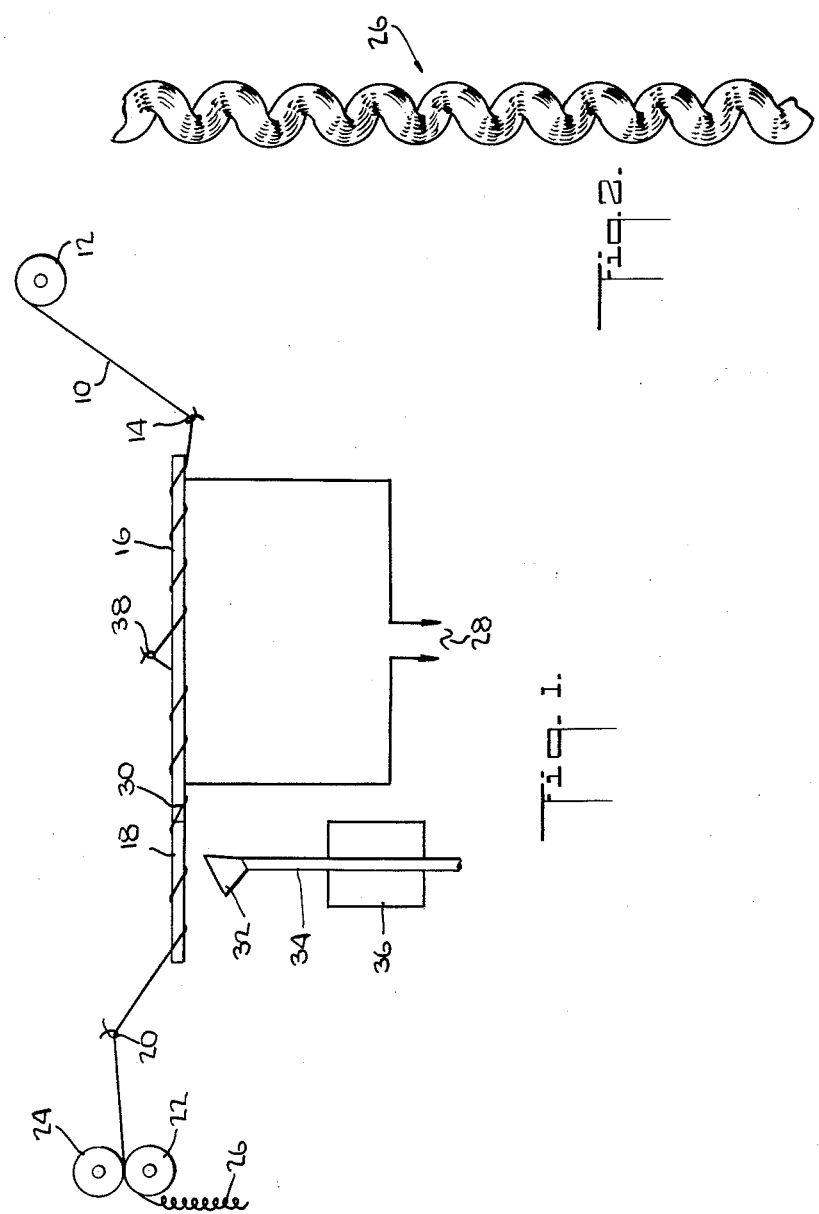

This invention relates to the manufacture of bulked filamentary materials and methods and means for their production.

An object of the invention is to provide an improved method and simplified means for bulking artificial filamentary materials.

Another object of the invention is to provide three-dimensional highly bulked thermoplastic filamentary material.

The invention is applicable to any artificial filamentary materials which are capable of being deformed by heat. The filamentary material may comprise organic acid esters of cellulose such as cellulose acetate, cellulose propionate, cellulose acetate butyrate, cellulose benzoate, other organic derivatives of cellulose such as ethyl cellulose, nylon or other linear polyamides, linear polyesters such as polyethylene terephthalate, polyacrylonitrile, polyolefins, protein fibers, mixtures thereof, and the like. Particularly good results are achieved when the filamentary material comprises an organic acid ester of cellulose having fewer than 0.12 free hydroxyl groups per anhydroglucose unit, e.g. cellulose acetate having an acetyl content in excess of about 59%, referred to as cellulose triacetate.

The filamentary material may comprise a continuous monofilament, a yarn made up of a plurality of continuous filaments, a yarn made up of staple length fibers, plies of such yarns, and the like. Non-thermoplastic fibers or filaments may be incorporated into the filamentary materials to be treated, and they will be bulked as a result of the changes effected in the thermoplastic components.

In accordance with the invention, generally, a filamentary material is wound in a plurality of helical turns or coils about a mandrel and an aligned extension thereof. Tension is applied to the filamentary material to advance the turns in sliding engagement with the mandrel and the extension. The advancing turns are subjected to heat while they are on the mandrel, following which the turns are advanced over the extension and subjected to a lower temperature to set the turns. To permit sliding movement of the engaging turns along the mandrel and its extension with a minimum of resistance, the mandrel and the extension are formed of a material which is smooth or polished. The mandrel and the extension are of any desired cross-section and diameter depending upon the contour desired for the coiled filament. The temperature to which the mandrel is heated and the rate of linear movement of the filamentary material over the mandrel and the extension are interrelated with each other and with the chemical and physical composition of the filamentary material to permit the latter to be thermoplastically deformed.

The invention is diagrammatically illustrated in the accompanying drawing in which:

FIG. 1 is a schematic lateral elevation of an apparatus for producing helically bulked thermoplastic filamentary material; and FIG. 2 illustrates the product of the process shown in FIG. 1.

Referring now more particularly to FIG. 1, there is shown a continuous filament yarn 10 drawn from a suitable source, such as a supply package 12, passed through a guide 14 and wound in a plurality of helical turns or coils about a heated mandrel 16 and an axially aligned extension 18 thereof. The yarn 10 then passes through another guide 20, between a pair of driven feed rolls 22, 24 and is then permitted to relax in helically bulked configuration 26. The mandrel 16 is heated electrically by being the resistance in an electric circuit through which current is passed from a source 28. Alternately, the mandrel may be heated by having one end extending into a heated fluid, by having a hollow interior into which steam is supplied, by radiant heat or by directing jets of hot fluid such as air thereagainst. The mandrel is made of a material having a low co-efficient of friction and which is highly heat-conductive. Nichrome satisfies the requirements of a low co-efficient of friction and heat conductivity, and is particularly suitable where the mandrel is heated by making it a resistance in an electrical circuit as shown. It may be flame-coated with Al Si Mag or the like to improve yarn movement thereon. The mandrel, which has a smooth, uniform and unbroken surface throughout its length, may be of any desired cross-section, such as circular, elliptical, or polygonal.

The extension 18 may be an integral continuation of the mandrel 16 and, like the mandrel, is smooth and of substantially the same uniform cross-section to allow the turns or coils to be slidingly advanced therealong as tension is applied to the filament, as by driven feed rolls 22, 24. As the filament turns slide along the extension they are subjected to a substantially lower temperature in order to set the filament to the helically coiled configuration acquired as it is advanced over the heated mandrel. The helical turns or coils thus advance in engagement with the mandrel and the extension through heated and comparatively cool zones. In order that the filament turns may be subjected to an abrupt change in temperature in passing from the heated mandrel zone to the comparatively cool extension zone, an insulator 30 may be disposed between separate mandrel and extension sections to thereby minimize heat transference. The insulator is, of course, sized and connected to the mandrel and the extension in a manner not to interfere with the progress of the filament turns.

The advancing turns when located on the extension 18 may be maintained at room temperature, and therefore comparatively chilled with respect to their temperature when located on the mandrel 16. Advantageously, however, cooling of the turns may be supplemented by directing cold air at extension 18 and the material thereon through nozzle 32 on an air line 34 which passes through a refrigerating chamber 36. Such rapid cooling ensures that the bulked configuration will not readily be lost in subsequent processing.

In practice, it has been found that better results are achieved when a guide 38 is provided to hold the filaments away from the mandrel 16 at a location shortly before the end of the heated zone.

From the foregoing, it will be apparent that the filament 10, when wound in helical turns about the mandrel 16 and the extension 18 and advanced in sliding engagement with the mandrel and the extension through the heated and comparatively cool zones, acquires a coiled configuration, which becomes set into such configuration when the continuous filament is drawn off.

By way of example, using a mandrel 0.080 inch in diameter and 0.6 feet long, heated to a temperature of about 440° F., and an extension of the same diameter and 0.25 feet long, against which there is directed air passed through a coil submerged in ice water at 32° F. a yarn composed of 190 continuous filaments of cellulose triacetate each of 7.9 denier is satisfactorily bulked at a linear velocity of 10 feet per minute.

The temperature of the mandrel has been varied from 400 to 500° F. with satisfactory results when using cellulose triacetate, and the refrigerant temperature has been as low as −70° F. The velocity can of course be lower but is advantageously as high as possible consistent with permanent insertion of the helical configuration; 20 feet per minute has been used with satisfactory results.

The resulting bulked filamentary material 26, shown in FIG. 2, may be used wherever bulked filamentary material produced by other processes, such as crimping, has been used. When cut into staple length fibers the novel material can be carded and spun into yarn or it can be incorporated into non-woven battings to impart loft and high porosity.

It is to be understood that the foregoing detailed description is given merely by way of illustration and that many variations may be made therein without departing from the spirit of our invention.

Having described our invention, what we desire to secure by Letters Patent is:

1. A method of bulking thermoplastic filamentary material comprising coiling said filamentary material about a first member and then about a second member in a plurality of helical turns, advancing the turns in sliding engagement with said first and second members, subjecting said turns to heat when disposed on said first member thermoplastically to deform them, and subjecting said turns to a lower setting temperature when disposed on said second member to set the turns.

2. The method set forth in claim 1, wherein said turns are subjected to heat when on said first member by heating said first member.

3. The method set forth in claim 2, wherein said first member is heated by passage of an electric current therethrough.

4. The method set forth in claim 1, wherein the coiled configuration is set into said filamentary material when on said second member by cooling said second member.

5. The method set forth in claim 4, wherein cooling of said second member is effected by directing cold air at said member.

6. The method set forth in claim 1, wherein said filamentary material comprises cellulose acetate.

7. The method set forth in claim 1, wherein said filamentary material comprises cellulose triacetate.

8. A method of bulking filamentary material comprising cellulose acetate which comprises coiling said filamentary material in a plurality of helical turns about a mandrel and an extension thereof, withdrawing said filamentary material from said extension thereby to advance the turns thereof along said mandrel and extension, heating said mandrel sufficiently to deform said filamentary material thermoplastically while on said mandrel, and cooling said filamentary material while on said extension to set the turns therein, said bulking of said filamentary material being caused by contact of said material with said heated mandrel.

9. An apparatus for bulking filamentary material comprising means for supplying filamentary material, a first and second member about which said filamentary material is successively helically coiled, said second member being an aligned axial extension of said first member, means for heating said filamentary material while on said first member, means for cooling said filamentary material while on said second member, and means for withdrawing said filamentary material from said second member.

10. The apparatus set forth in claim 9, wherein said heating means comprises an electrical circuit including said first member thereby to heat said first member and the filamentary material when coiled thereabout.

11. The apparatus set forth in claim 9, including means for cooling said second member and thereby to set the coiled configuration in the filamentary material.

12. The apparatus set forth in claim 9, including means for displacing said filamentary material from said first member, said displacing means being disposed to act on said filamentary material before arriving at the end of said first member so that said filamentary material thereafter re-engages said first member.

13. The apparatus set forth in claim 9, wherein said first and second members respectively comprise a mandrel and an aligned axial extension thereof.

14. The apparatus set forth in claim 9, including insulating means separating said first member from said second member so as to minimize heat transference therebetween.

15. A method of bulking thermoplastic filamentary material comprising coiling said filamentary material about a first member in a plurality of helical turns, displacing said filamentary material from said first member before arriving at the end of said first member and allowing said filamentary material to re-engage and recoil about said first member and then coil about a second member in a plurality of helical turns, advancing the turns in sliding engagement with said first and second members, subjecting said turns to heat when disposed on said first member thermoplastically to deform them, and subjecting said turns to a lower setting temperature when disposed on said second member to set the turns.

16. The method set forth in claim 1, wherein said turns are advanced by tension applied to said filamentary material.

17. A method of bulking filamentary material comprising cellulose acetate which comprises coiling said filamentary material in a plurality of helical turns about an elongated member and an extension thereof, withdrawing said filamentary material from said extension thereby to advance the turns thereof along said elongated member and extension, heating said elongated member sufficiently to deform said filamentary material thermoplastically while on said elongated member and cooling said filamentary material while on said extension to set the turns therein, said bulking of said filamentary material being caused by contact of said material with said heated elongated member.

18. The process of claim 1 wherein said first and second members are stationary.

19. The apparatus of claim 9 wherein said first and second members are stationary.

References Cited in the file of this patent

UNITED STATES PATENTS

| | | |
|---|---|---|
| 2,332,489 | Reinhardt | Oct. 19, 1943 |
| 2,394,165 | Getaz | Feb. 5, 1946 |
| 2,451,919 | Clarkson | Oct. 19, 1948 |
| 2,669,001 | Keen | Feb. 16, 1954 |
| 2,869,312 | Van Dijk | Jan. 20, 1959 |
| 2,881,504 | Billion | Apr. 14, 1959 |
| 2,921,358 | Cox et al. | Jan. 19, 1960 |

FOREIGN PATENTS

| | | |
|---|---|---|
| 210,620 | Australia | Oct. 9, 1957 |
| 790,163 | Great Britain | Feb. 5, 1958 |
| 793,711 | Great Britain | Apr. 23, 1958 |